United States Patent [19]

Hiramatsu et al.

[11] Patent Number: 5,072,311

[45] Date of Patent: Dec. 10, 1991

[54] FILM IMAGE READING APPARATUS WITH LENGTH/WIDTH DISCRIMINATION SIGNAL

[75] Inventors: Akira Hiramatsu, Yokohama; Kenji Yoshinaga, Tokyo; Kazunori Kanekura, Yokohama; Yukio Sato, Chigasaki; Ritsushi Tanabe, Kawasaki; Hideaki Shimizu, Yokohama, all of Japan

[73] Assignee: Canon Kabushiki Kaisha, Tokyo, Japan

[21] Appl. No.: 475,881

[22] Filed: Feb. 6, 1990

[30] Foreign Application Priority Data

Feb. 8, 1989 [JP] Japan ................................. 1-27638
Feb. 8, 1989 [JP] Japan ................................. 1-27641
May 10, 1989 [JP] Japan ............................... 1-117029

[51] Int. Cl.$^5$ ............................................. H04N 1/04
[52] U.S. Cl. .................................. 358/487; 358/449; 358/488
[58] Field of Search ............... 358/487, 488, 449, 498, 358/474

[56] References Cited

U.S. PATENT DOCUMENTS

| | | | |
|---|---|---|---|
| 3,781,103 | 12/1973 | DiPietro | 353/111 |
| 4,071,232 | 1/1978 | Fujimoto | 358/488 |
| 4,439,790 | 3/1984 | Yoshida | 358/449 |
| 4,554,592 | 11/1985 | Yoshida | 358/449 |
| 4,642,700 | 2/1987 | Ohta et al. | 358/488 |
| 4,682,242 | 7/1987 | Sugita | 358/401 |
| 4,700,237 | 10/1987 | Yoshioka et al. | 358/287 |
| 4,737,856 | 4/1988 | Shimizu | 358/498 |
| 4,763,200 | 8/1988 | Nakatani et al. | 358/449 |
| 4,809,037 | 2/1989 | Sato | 355/4/355/14 |
| 4,825,065 | 4/1989 | Imai | 250/205 |
| 4,827,526 | 5/1989 | Matsumoto | 358/449 |
| 4,829,371 | 5/2989 | Hiramatsu et al. | 358/80 |
| 4,855,839 | 8/1989 | Saito | 358/449 |
| 4,916,747 | 4/1990 | Arimoto | 328/47 |
| 4,922,335 | 5/1990 | Outa et al. | 358/80 |

Primary Examiner—Benjamin R. Fuller
Assistant Examiner—Eric Frahm
Attorney, Agent, or Firm—Fitzpatrick, Cella, Harper & Scinto

[57] ABSTRACT

A film image reading apparatus has a conveying section for sequentially conveying a plurality of film originals to a reading position, a reading section for reading an image of a film original conveyed to the reading position by the conveying section, a detecting section for detecting a direction of the image of the film original conveyed to the reading position, and a controlling section for controlling outputting of an image signal from the reading section in accordance with the direction of the image detected by the detecting section.

16 Claims, 8 Drawing Sheets

TO FIG. 1B

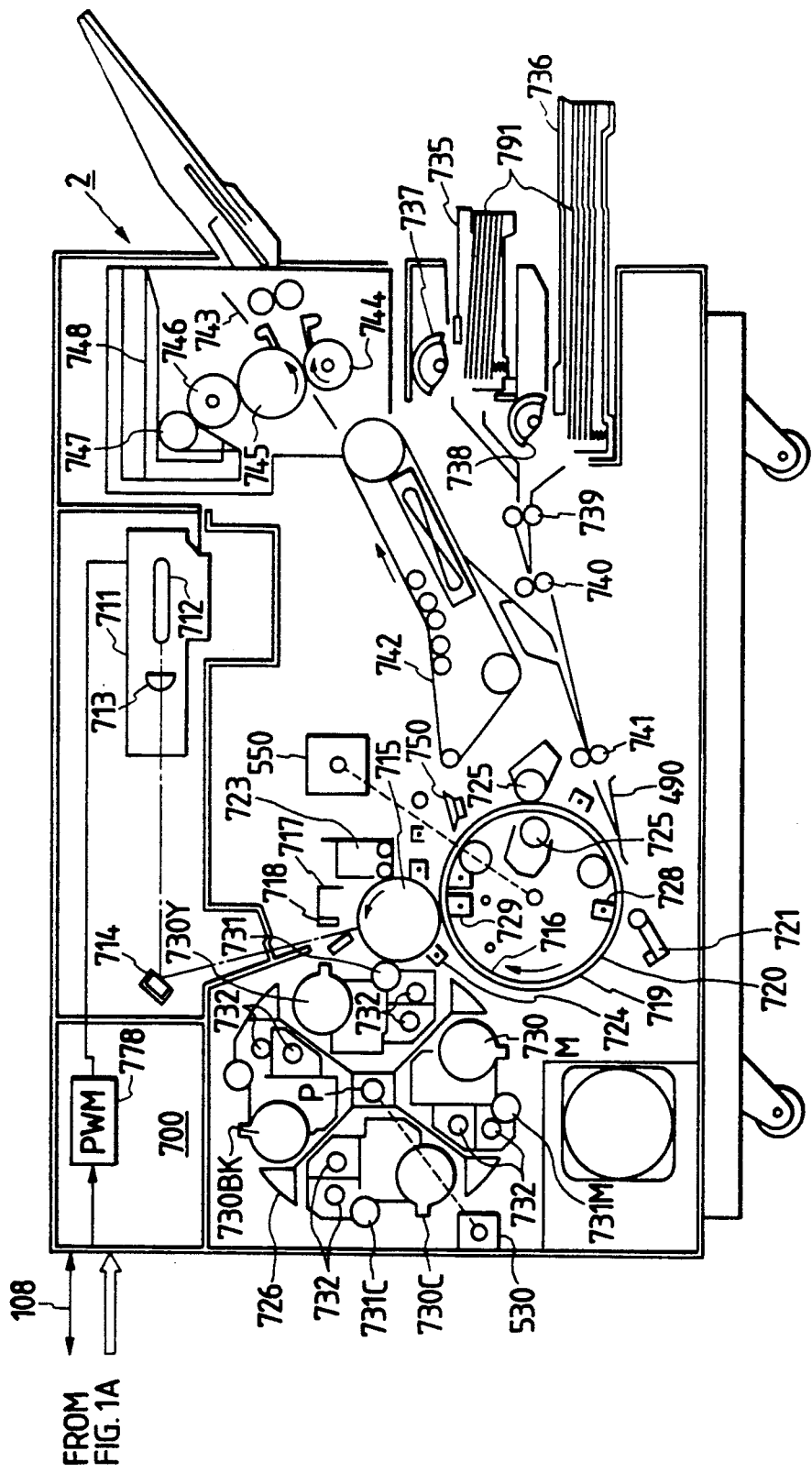

FILM IMAGE READING APPARATUS WITH LENGTH/WIDTH DISCRIMINATION SIGNAL

BACKGROUND OF THE INVENTION

1. Field of the Invention

The present invention relates to a film image reading apparatus and, more particularly, to a film image reading apparatus which projects an image of a light transmission original such as a film onto a reading sensor and sequentially converts image data into electrical signals.

2. Related Background Art

A film image reading apparatus of this type radiates light onto a film surface of a positive or negative film, transmission light from the film is projected onto a reading sensor by an optical system, and electrical signals from the reading sensor are read as image data. The reading sensor comprises a line image sensor of, e.g., a CCD. The sensor mechanically scans a projection surface to obtain image data on the entire surface of the film. In general, a film is mounted on a slide mount, and is then set at a predetermined position of the film image reading apparatus. Thus, image reading can be executed without directly touching the film.

However, in the conventional film image reading apparatus of this type, film originals must be set at the predetermined position of the reading apparatus one by one, resulting in poor operability. In order to read a plurality of film originals, each film must be set for every reading operation. In order to solve this problem, a so-called automatic changer in which a plurality of slides for a slide projector for projecting an image of a slide onto a screen are set on a slide tray, and are sequentially and automatically fed and projected may be applied to the film image reading apparatus. However, when the automatic changer with the conventional structure is used, a reading operation is executed regardless of the presence/absence of slides. When no slide is set, the apparatus may read blank as image data, thus posing a new problem.

In general, a slide mount has a square (about 50 mm × 50 mm) frame having a central rectangular (about 22.5 mm × 34.3 mm) aperture in which a film is fitted. When a film is mounted on an image reading apparatus, the slide mount must be set at a length or width position in correspondence with a rectangular reading area. If the slide mount is set at a wrong position, an image may be omitted or a black frame of a slide mount may be read.

When an image to be read is prevented from being omitted at both the length and width positions, the black frame of the slide mount is undesirably read.

When an image signal obtained by reading a film is supplied to an external recording apparatus and is printed on a recording paper sheet, if the direction of the recording paper does not match with the set direction of the slide mount, a film image cannot fall within the recording paper sheet, resulting in omission of an image.

SUMMARY OF THE INVENTION

The present invention has been made in consideration of the above situation, and has as its object to provide a film image reading apparatus which can an image of a film original.

It is another object of the present invention to provide reading apparatus which can be operated to match with the direction of an image of a film original to be read.

It is still another object of the present invention to provide a film image reading apparatus which can be operated in accordance with the presence/absence of a film original to be read.

It is still another object of the present invention to provide a film image reading apparatus which sequentially feeds a plurality of film originals, and is suitable for reading an image of the fed film original.

The above and other objects and features of the present invention will be apparent from the following description.

BRIEF DESCRIPTION OF THE DRAWINGS

FIGS. 1A and 1B are respectively a perspective view and a sectional view of a film image reading apparatus and an external recording apparatus;

DETAILED DESCRIPTION OF THE PREFERRED EMBODIMENT

An embodiment of the present invention will be described below with reference to the accompanying drawings. Prior to a description of the present invention, items associated with a slide mount and a detection means for detecting film transmission light which are applied to the present invention will be described below.

Figure 2:
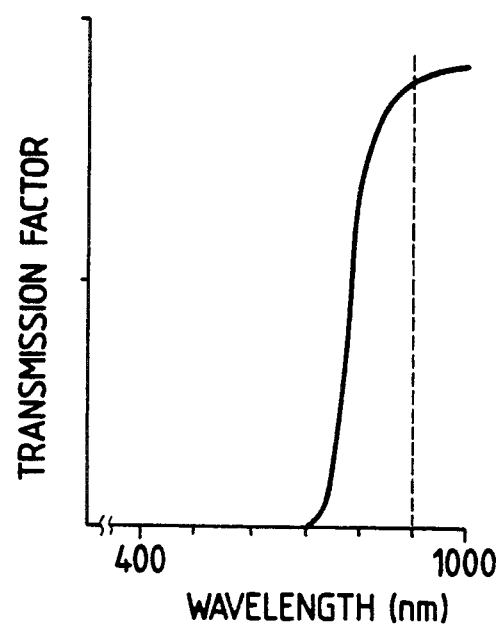
FIGS. 2 and 3 are graphs showing spectral character of a normal film.
Figure 3:
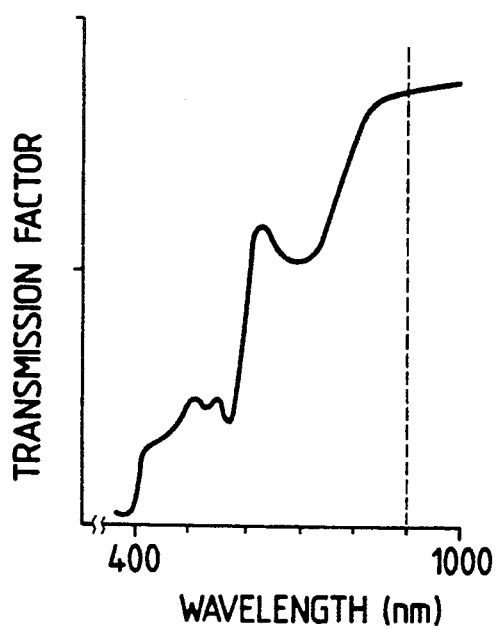

FIGS. 2 and 3 show spectral transmission factors of non-exposed portions of a general reversal film and a negative film, respectively. In FIGS. 2 and 3, a wavelength is plotted along the abscissa, and a transmission factor is plotted along the ordinate. More specifically, as can be seen from FIGS. 2 and 3, a very high transmission factor is obtained with infrared rays having a wavelength of 900 nm or more. In general, image data is recorded on a film as a change in transmission factor in a visible wavelength range of about 400 nm to 800 nm. It was experimentally demonstrated that a transmission factor exhibited almost a constant value at a wavelength of 900 nm or more regardless of a transmission factor in a visible wavelength range.

Figure 4:
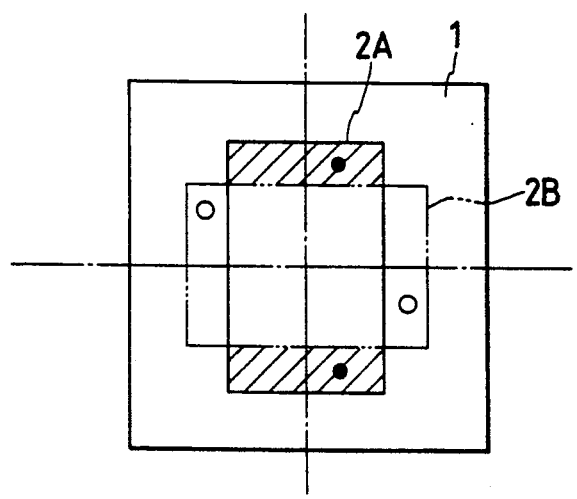
FIG. 4 is a view for explaining a slide mount.

A slide mount is arranged as shown in FIG. 4.

A slide mount 1 has a square shape, and has a central rectangular aperture 2A or 2B. The aperture 2A indicated by a solid line in FIG. 4 is one for a length position, and the aperture 2B indicated by an alternate long and two short dashed line is one for a width position. Thus, some areas can fall within the aperture 2A at the length position but may fall outside the aperture 2B at the width position. More specifically, such areas correspond to hatched portions in FIG. 4. For example, photoelectric transducers for detecting whether or not light emitted from known light sources (e.g., IREDs) are arranged at positions indicated by black dots to detect transmission infrared rays, thus detecting whether the slide mount 1 is at the length or width position.

Figure 1A:
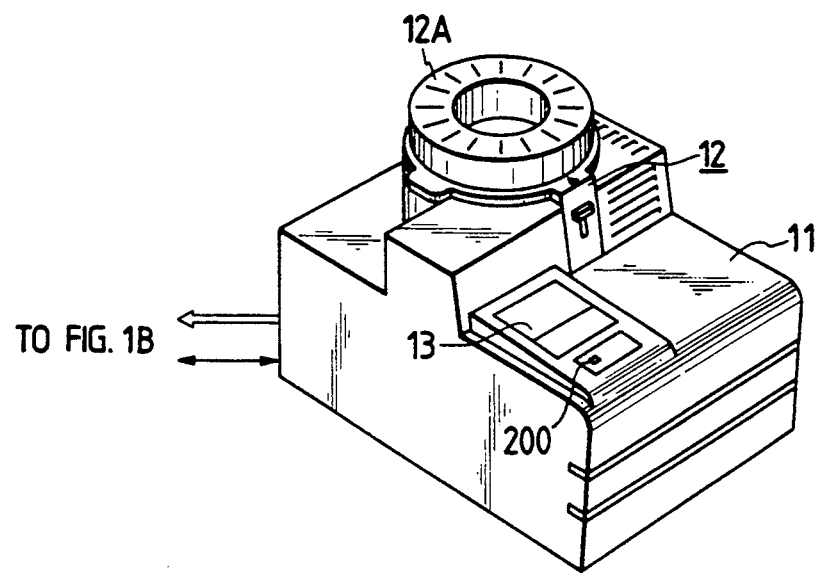

FIGS. 1A and 1B show a film image reading apparatus and an external recording apparatus which constitute an image processing system.

The film image reading apparatus shown in FIG. 1A will be described below. The apparatus shown in FIG. 1A includes an apparatus main body 11, an automatic changer 12, and a viewer 13. The automatic changer 12 automatically and sequentially inserts a plurality of slide mounts (not shown) set on a slide tray 12A in a film original set position (to be described later) of the main body 11, and causes the reading apparatus 11 to read the inserted slide. An image of a film at the film original set position is projected onto the viewer 13.

Figure 5:
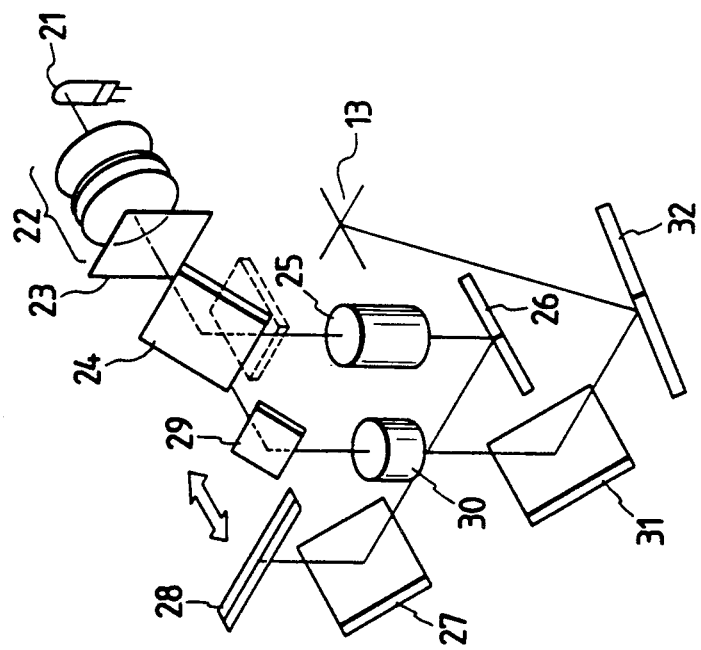
FIG. 5 is a perspective view showing an arrangement of a reading optical system.

FIG. 5 is a perspective view of an optical system of the film image reading apparatus 11. The optical system is constituted by a halogen lamp 21 as a light source, an illumination optical system 22 consisting of a condenser lens, an infrared set filter, a field lens, and the like, a film original 23, an optical path selection mirror 24 for switching an optical path to a reading optical system or to a pure optical system, and a projection lens 25 for projecting an image on the film original 23 onto a line image sensor 28 through reflection mirrors 26 and 27. The selection mirror 24, the projection lens 25, and the reflection mirrors 26 and 27 constitute a reading optical system. Note that the line image sensor 28 is sub-scanned in a direction of an arrow in FIG. 4 by a scanning mechanism (not shown), thereby sequentially converting image data of the film original 23 projected by the projection lens 25 into electrical signals. The electrical signals are output to the external recording apparatus shown in FIG. 1B.

The pure optical system will be described below. When an image of the film original 23 is projected onto the viewer 13 shown in FIG. 1A, the selection mirror 24 is escaped outside the optical path, as indicated by a broken line in FIG. 5, so that an image of the film original 23 illuminated through the illumination optical system 22 is projected onto the viewer 13 through a reflection mirror 29, a projection lens 30, and reflection mirrors 31 and 32.

A color printer 2 as the external recording apparatus shown in FIG. 1B will be briefly described below. The color printer 2 includes a scanner 711 as a laser output unit for converting an image signal from the reading apparatus shown in FIG. 1A into an optical signal, a polygonal mirror 712 of a polygon (e.g., an octahedron), a motor (not shown) for rotating the mirror 712, an f/θ lens (focusing lens) 713, and the like. The printer 2 includes a reflection mirror 714 for changing an optical path of a laser beam, and a photosensitive drum 715. A laser beam output from the laser output unit is reflected by the polygonal mirror 712, and raster-scans the surface of the photosensitive drum 715 via the lens 713 and the mirror 714, thereby forming a latent image corresponding to an original image thereon.

Furthermore, the printer 2 includes a primary charger 717, an entire-surface exposure lamp 718, a cleaner unit 723 for recovering non-transferred residual toner, and a pretransfer charger 724. These members are arranged around the photosensitive drum 715.

Moreover, the printer 2 includes a developer unit 726 for developing an electrostatic latent image formed on the surface of the photosensitive drum 715 by laser exposure, developing sleeves 731Y, 731M, 731C, and 731BK each of which is brought into contact with the photosensitive drum 715 to directly perform development, toner hoppers 730Y, 730M, 730C, and 730BK for storing supplemental toners, and a screw 732 for transferring a developing agent. The sleeves 731Y to 731BK, the toner hoppers 730Y to 730BK, and the screw 732 constitute the developer unit 726, and are disposed around a rotating shaft P of the developer unit. For example, when a yellow toner image is to be formed, yellow toner development is performed at the illustrated position of FIG. 1B. When a magenta toner image is to be formed, the developer unit 726 is rotated about the shaft P in FIG. 1B to locate the developing sleeve 731M in the magenta developer at a position contacting the photosensitive drum 715.

The printer 2 also includes a transfer drum 716 for transferring a toner image formed on the photosensitive drum 715 onto a paper sheet, an actuator plate 719 for detecting a moving position of the transfer drum 716, a home position sensor 720 which comes closer to the actuator plate 719 to detect that the transfer drum 716 is moved to its home position, a transfer drum cleaner 725, a discharger 728, and a transfer charger 729. These members 719, 720, 725, and 729 are disposed around the transfer drum 716.

The printer 2 further includes paper feed cassettes 735 and 736 for storing paper sheets as recording media. The cassette 735 is an A4 cassette, and the cassette 736 is an A4R cassette. One of these cassettes 735 and 736 is selected by a length/width discrimination signal (A4-/A4R) 108 from the film image reading apparatus 11.

More specifically, when the length/width discrimination signal is at "H" level, the A4 cassette 735 is selected; otherwise, the A4R cassette 736 is selected. Paper feed rollers 737 and 738 are used to feed paper sheets from the cassettes 735 and 736, and paper feed and convey timings are taken by timing rollers 739, 740, and 741. A paper sheet fed and conveyed via these rollers is guided to a paper guide 749, and is then wound around the transfer drum 716 while its leading end is held by a gripper to be subjected to the next image formation process.

The printer 2 further includes a drum motor 550 for synchronously rotating the photosensitive drum 715 removing a paper sheet from the transfer drum 716 after the image formation process is completed, a conveyor belt 742 for conveying the removed paper sheet, and an image fixing unit 743 for fixing an image on the paper sheet conveyed by the conveyor belt 742. The image fixing unit 743 has a pair of heat compression rollers 744 and 745.

The respective sections of the printer 2 are controlled by a printer controller 700. The printer controller 700 comprises a PWM circuit 778 for supplying a recording signal which is pulse-width modulated based on image data transferred from the reading apparatus shown in FIG. 1A to the scanner 711.

When no paper sheet corresponding to a direction indicated by the length/width discrimination signal 108 is stored in the cassettes 735 and 736, the color printer 2 outputs a signal indicating this message to the film image reading apparatus 11.

Then, a control section 101 (to be described later) of the film image reading apparatus 11 determines that image recording matching with a film direction cannot be executed, interrupts image reading, and displays a message indicating this to an operator.

Figure 6:
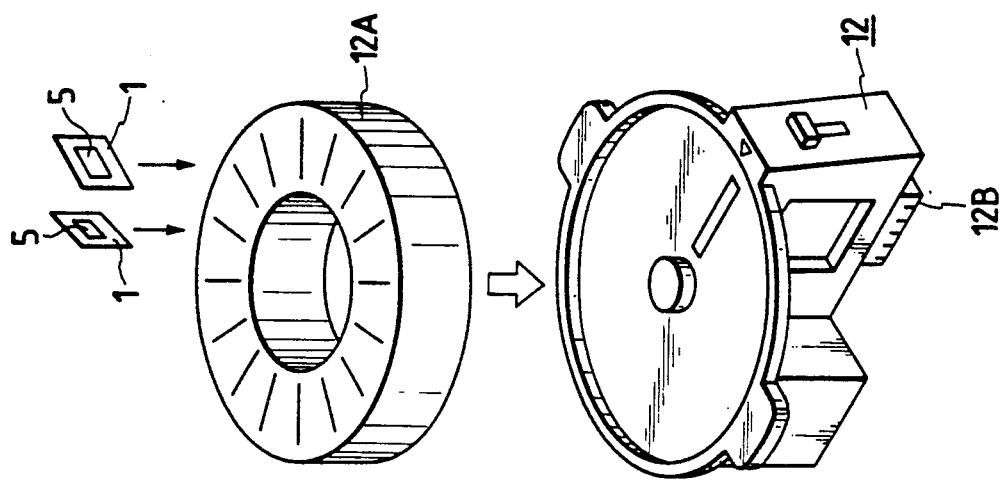
FIG. 6 is a perspective view of an automatic film feeder.

FIG. 6 is a perspective view of the automatic changer 12 and the slide tray 12A of the image reading apparatus shown in FIG. 1A. The slide tray 12A can be set up with a plurality of films 5 mounted on slide mounts 1 from a direction of an arrow, and is already known to those who are skilled in the art (e.g., U.S. Pat. No. 3,781,103). The automatic changer 12 is detachable with the film image reading apparatus 11. The changer 12 incorporates a mechanism for vertically moving each slide mount 1 set on the slide tray 12A to set the film 5 at a reading position, as will be described later, a mechanism for rotating the slide tray 12A, a mechanism for locking the slide tray 12A not to be rotated, and the like. A connector portion 12B is connected to the apparatus main body 11 to supply power to motors for driving these mechanisms and transmitting signals.

Figure 7:
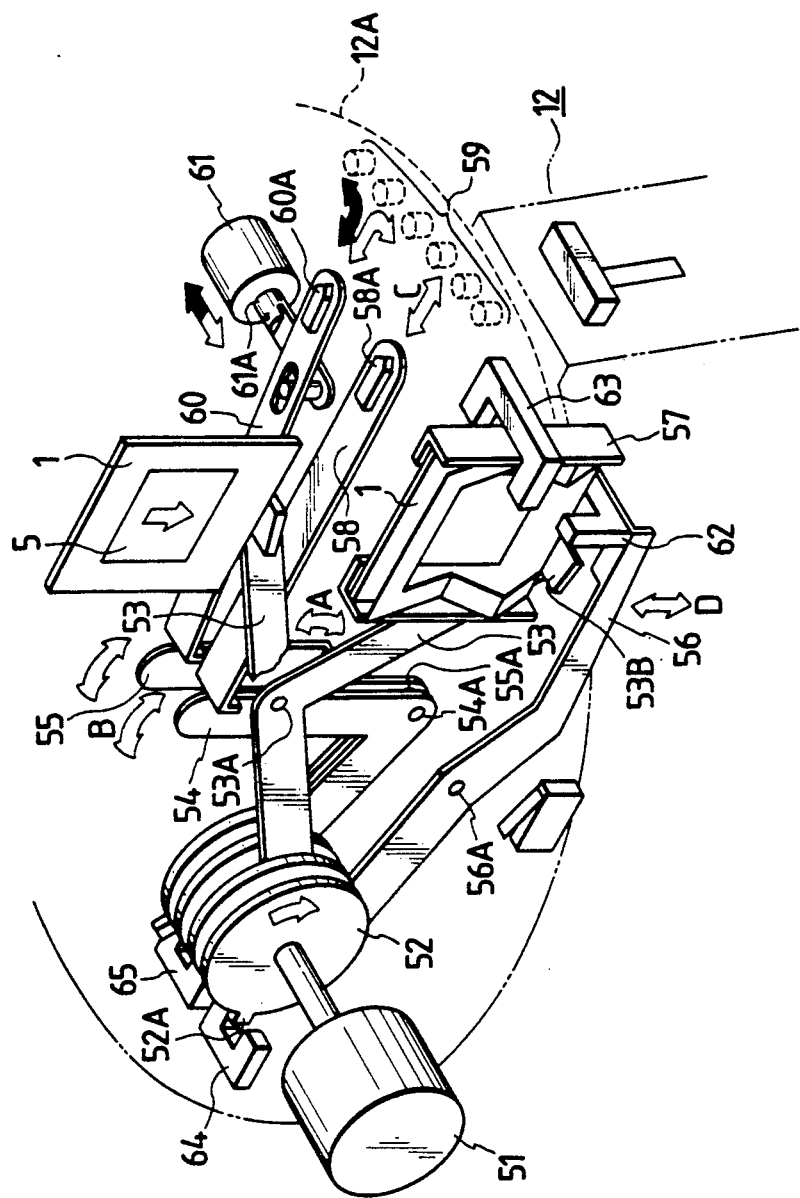
FIG. 7 is an exploded perspective view showing the structure of the film feeder shown in FIG. 6.

The mechanisms incorporated in the automatic changer 12 will be described below with reference to FIG. 7.

A plurality of transmission cams 52 are integrally fixed to an output shaft of a drive motor 51. A rotational force of the motor 51 is transmitted to levers 53, 54, 55, and 56 through the transmission cams 52. More specifically, the first lever 53 is swingably supported about a rotational center 53A. A film drive portion 53B for vertically moving the slide mount 1 set on the slide tray 12A (FIG. 6) is arranged at one end of the first lever 53. When the lever 53 is reciprocated in the vertical direction indicated by an arrow A, the slide mount 1 can be vertically moved.

A film holder 57 holds each slide mount 1 on the reading apparatus of the automatic changer 12, and is set with the slide mount 1 guided from the slide tray 12A. The second lever 54 is pivotally supported about a rotational center 54A, and is swung as indicated by an arrow B by the transmission cams 52 in the same manner as the first lever 53. A horizontal lever 58 is arranged at one end of the second lever 54 to be interlocked therewith. The lever 58 reciprocally slides in a direction of an arrow C upon swinging movement of the lever 54. When the lever 58 is moved to the right, a fixing portion 58A arranged at one end of the lever 58 is inserted between two adjacent pins of a plurality of pins 59 arranged on the entire periphery of the slide tray 12A, thus locking the slide tray 12A to the automatic changer 12.

The third lever 55 is pivotally supported about a rotational center 55A, and is swung by the transmission cams 52. A horizontal lever 60 is arranged at one end of the third lever 55 to be interlocked therewith. The lever 60 reciprocally slides according to the swinging movement of the third lever 55. Upon this reciprocal sliding movement of the lever 60, the slide tray 12A is rotated for an angle corresponding to one slide. More specifically, the rotating operation is achieved by horizontal swinging movement upon reciprocal movement of the lever 60. A distal end portion 60A arranged at one end of the lever 60 pushes the pins 59 disposed at the outer peripheral portion of the slide tray 12A in a rotational direction of the slide tray 12A.

A solenoid 61 changes the direction of the distal end portion 60A upon reciprocal movement of the lever 60 to change the rotational direction of the slide tray 12A. For example, when the solenoid 61 is energized, an iron core 61A is attracted to reciprocate the lever 60, as indicated by a black arrow in FIG. 7. In this case, the lever 60 pushes the pins 59 counterclockwise and consequently rotates the slide tray 12A in the same direction. When the solenoid 61 is not energized, the lever 60 is reciprocated, as indicated by a white arrow in FIG. 7, and pushes the pins 59 clockwise in FIG. 7. As a result, the slide tray 12A is rotated clockwise to be fed by one frame of the slide.

The fourth lever 56 is pivotally supported about a rotational center 56A, and is vertically moved in a direction of an arrow D by the transmission cams 52. A photointerrupter 62 for detecting the length or width position of a film image is attached to one end of the fourth lever 56. When the film 5 is at the length position, light-emitting and light-receiving portions of the photointerrupter 62 are guided within the aperture 2A; when the film 5 is at the width position, they are guided outside the aperture 2B, thereby determining the length or width position of the film 5. Note that the photointerrupter 62 is placed outside the optical path in an image reading mode.

A photointerrupter 63 detects the presence/absence of a mount in the film holder 57. When the film 5 is present in the film holder 57, the photointerrupter 63 is interrupted by the mount 1. A photointerrupter 64 is used for detecting an initial position of the transmission cams 52, and a photointerrupter 65 is used for detecting a film image length/width detection timing. Projections 52A for interrupting the photointerrupters 64 and 65 are formed at corresponding timing positions of the transmission cams 52.

A series of operations of the automatic changer 12 will be described below.

At an initial position, the first lever 53 holds the mount 1 at a lower position, the second lever 54 is held in a state of locking the slide tray 12A, the third lever 55 is held in a state of inhibiting the feed operation of the slide tray 12A, and the fourth lever 56 is held in a state of guiding the photointerrupter 62 outside the optical path. When the motor 51 begins to rotate, the first lever 53 is rotated counterclockwise by the transmission cam 52 to push up the mount 1. At the same time, the fourth lever 56 is rotated counterclockwise, and the photointerrupter 62 enters the optical path and is set at a film length/width detection position. The second lever 54 is then rotated counterclockwise to release the locked state of the slide tray 12A, and the third lever 55 is rotated clockwise to rotate and feed the slide tray 12A in a predetermined direction by one frame.

Upon completion of the slide tray feed operation of the third lever 55, the second lever 54 is rotated clockwise to lock the slide tray 12A again. After the locking operation of the slide tray is completed, the first lever 53 is rotated clockwise to cause the mount 1 to fall into the film holder 57. The fourth lever 56 causes the photointerrupter 62 to escape outside the optical path after the film length/width position detection, thus completing a series of operations. The series of operations are executed during one revolution of the transmission cams 52.

Figure 8:
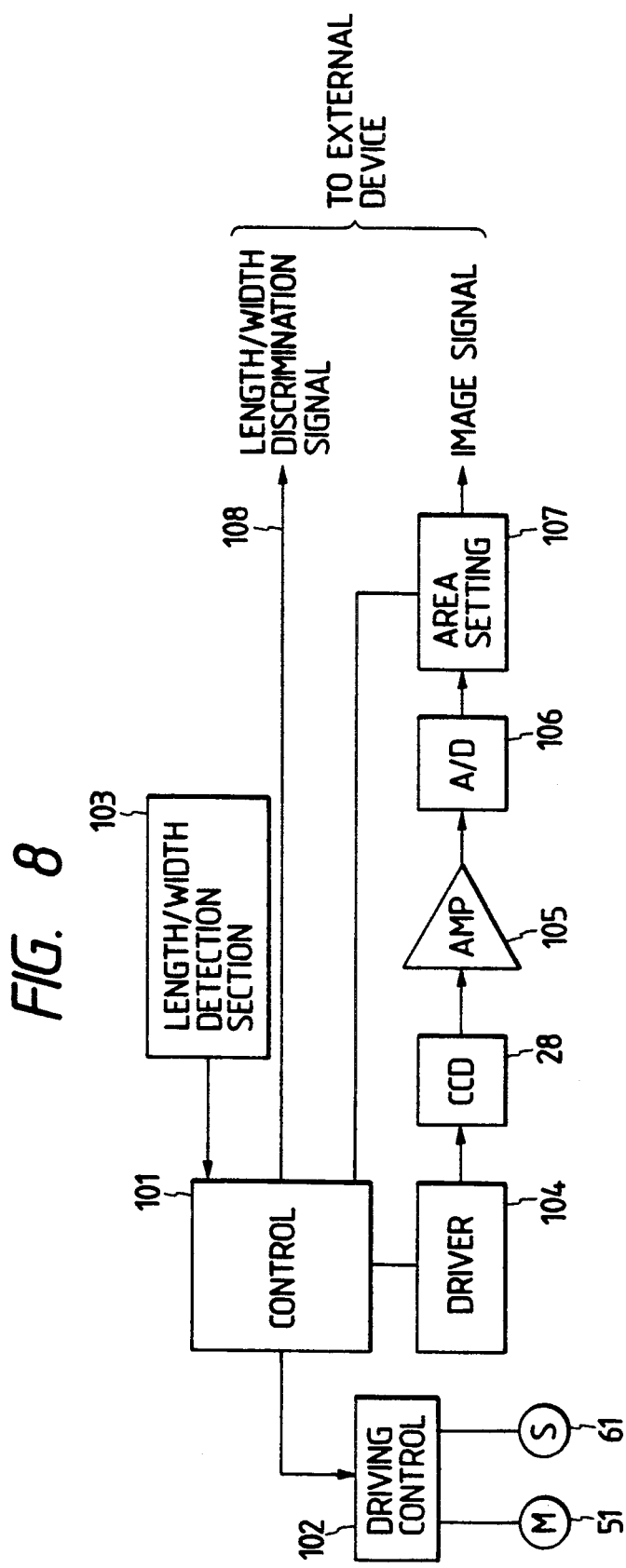
FIG. 8 is a block diagram showing a circuit arrangement for controlling the present invention.

FIG. 8 shows an arrangement of a circuit for controlling the film image reading apparatus shown in FIG. 1A. The circuit includes the control section 101 for controlling the motors, sensors, and the like of the overall reading apparatus, a drive control section 102 for controlling the drive motor 51, the solenoid 61, and the like of the automatic changer 12, a length/width detection section 103 for detecting a length/width position of the film 5, a driver 104 for driving the line image sensor 28, an amplifier 105 for amplifying an output from the image sensor 28, an A/D converter 106 for sequentially A/D-converting an output signal from the image sensor 28 amplified by the amplifier 105, and an area setting section 107 for setting an image area at a length or width position based on the detection result of the length/width detection section 103. The area setting section 107 outputs an image signal in a setup image area to the printer 2. The control section 101 outputs the length/width discrimination signal 108 indicating the length or width position of the film based on the detection result of the length/width detection section 103 to the external device (printer 2).

Figure 9:
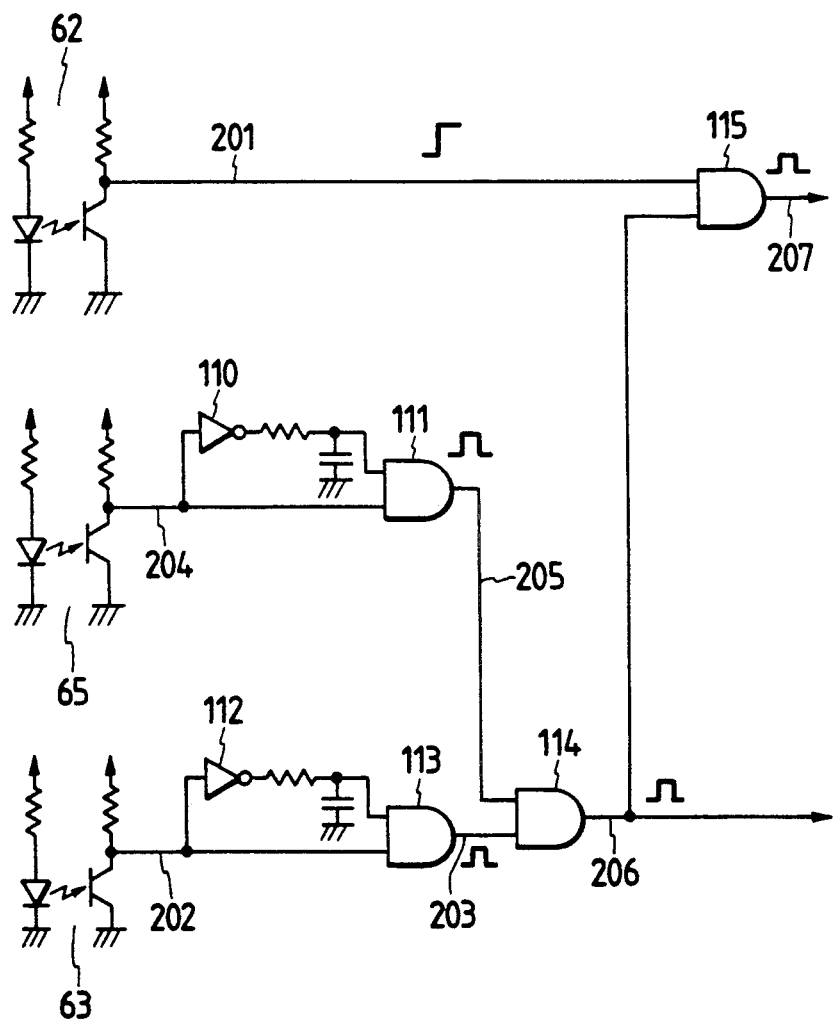
FIG. 9 is a circuit diagram of a film length/width detection section according to the present invention.

FIG. 9 shows the arrangement of the length/width detection section 103 which utilizes the principle described with reference to FIG. 4. The length/width detection section 103 is constituted by the photointerrupter 62 for detecting the length/width position of the film 5, the photointerrupter 63 for detecting the presence/absence of the film 5, the photointerrupter 65 for detecting a timing of the photointerrupter 63, inverters 110 and 112, AND gates 111, 113, 114, and 115, and the like. When the film 5 is at the length position, an output 201 of the photointerrupter 62 goes to L level since light is transmitted through the aperture 2A of the mount 1. When the film is at the width position, the output 201 goes to H level since light is shielded by the mount 1. When the film 5 is held in the film holder 57, an output 201 of the photointerrupter 62 goes to H level since light is shielded by the mount 1; otherwise, it goes to L level.

The output signal 202 is output as a pulse output 203 having a predetermined pulse width by the inverter 112, a resistor, a capacitor, and the AND gate 113. An output 204 of the photointerrupter 65 goes to H level at a detection timing, and is also output as a pulse output 205 having a predetermined pulse width by the inverter 110, a resistor, a capacitor, and the AND gate 111. The timing detection output pulse 205 and the film presence/absence detection output pulse 203 are input to the AND gate 114, and its AND output 206 goes to H level when the film 5 is present at the detection timing. The AND output 206 is input to the AND gate 115 together with the output 201 from the length/width detection section, and its AND output 207 goes to H level when the film 5 is present at the width position.

Thus, the control section 101 determines the length position of the film 5 when the AND output 206 from the length/width detection section 103 is at H level, and the AND output 207 is at L level, and determines the width position of the film 5 when the AND output 206 is at H level and the AND output 207 is at H level. The control section 101 then outputs the length/width discrimination signal 108 indicating the length/width position of the film to the external device. When the presence of the film 5 is determined based on the output signal from the length/width detection section 103, the area setting section 107 sets an area according to an image area in accordance with the detection result of the length/width position, and performs an image reading operation to extract and output a read image signal within the setup area. More specifically, when the length position is detected, an area defined by the aperture 2A shown in FIG. 4 is set as an effective area; when the width position is detected, an area defined by the aperture 2B is set as an effective area.

When the film is inserted at either the length or width position, an image signal can be read without reading a black frame.

When the absence of the film is determined based on the output signal from the length/width detection section 103, the drive control section 102 restarts a film feed operation, and continuously executes the operation until the presence of the next film is detected.

Figure 10:
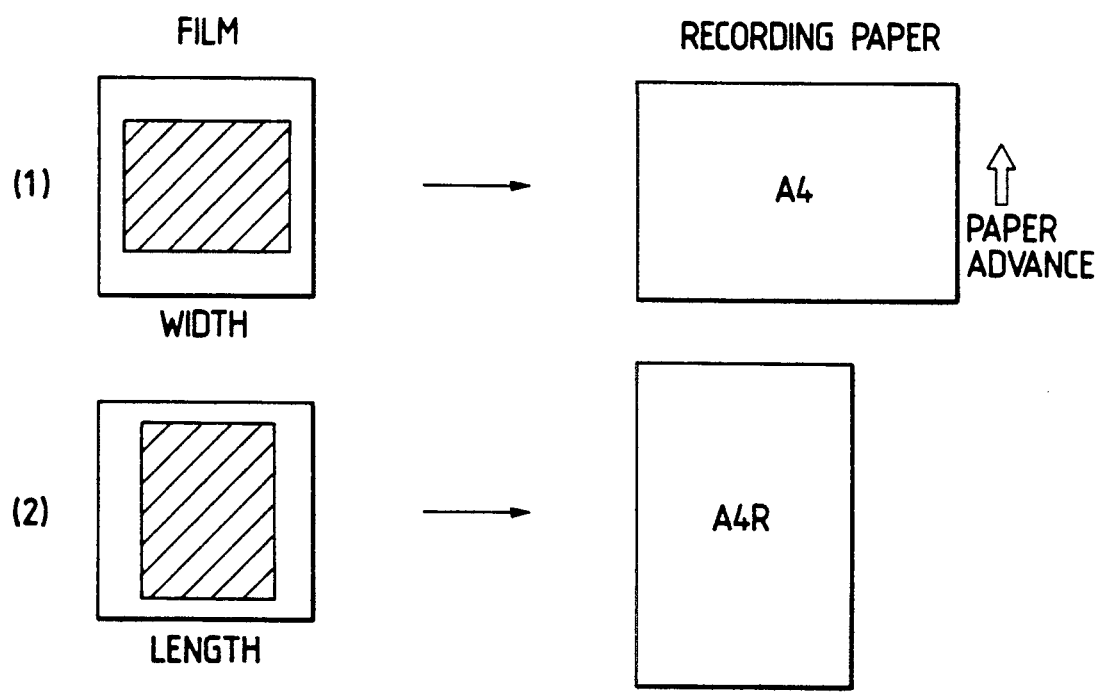
FIG. 10 shows the relationship between film positions and recording paper directions.

FIG. 10 shows examples of appropriate selection of a length/width size of a recording paper sheet with respect to the length/width direction of a film. For example, A4 (width) paper or A4R (length) paper is selected. As shown in (1) of FIG. 10, when it is determined that the film is at the width position, A4 recording paper is selected, and when it is determined that the film is at the length position, A4R recording paper is selected, so that a film original can be recorded at a correct length-to-width ratio.

In the above embodiment, length/width detection of a film is executed based on the direction of the slide mount. However, the length direction of the film does not always correspond to the length direction of an actual object. In some cases, a film image of a length direction may be recorded on recording paper of a width direction. In a photographing operation, a camera may be held at either a length or width position.

As a means for solving this problem, a recording paper length/width selection function upon detection of a film direction by the length/width detection section 103 is inhibited to allow arbitrary selection.

In this embodiment, the color printer has been exemplified as the external device. However, the present invention is not limited to this. For example, a device for displaying an image using, e.g., a CRT may be used as the external device, and a display direction of an image on a display screen may be controlled on the basis of a length/width signal of film position detection.

As described above, a length/width detection means for detecting a length/width position of a film image is arranged, and a reading area of an image is set based on the detection result, so that reading of an unnecessary image area or omission of an image can be prevented.

A length/width discrimination signal is output to the external device (e.g., an external recording apparatus) to cause it to select a length or width size of recording paper. Thus, a film original can be precisely recorded without changing its length-to-width ratio.

The present invention is suitable for preventing an erroneous operation when a square slide mount is used, and is particularly suitable when a so-called automatic changer for automatically feeding a plurality of slides to a reading apparatus for reading the slide is arranged since a film set state inside the slide tray need not be confirmed upon every operation.

As described above, the length or width position of a film to be read is detected, and the detection result is output to an external device. As a result, the external device can execute processing matching with a film set position direction.

The present invention is suitable for preventing an erroneous operation when a square slide mount is used, and is particularly suitable when a so-called automatic changer for automatically feeding a plurality of slides to a reading apparatus for reading the slide is arranged since a film set state inside the slide tray need not be confirmed upon every operation.

As described above, a film presence/absence detection means for detecting the presence/absence of a film is arranged, and a film feeding means and an image reading means are controlled based on the detection result. As a result, when a film is absent, a reading operation is inhibited, the next film feed operation is subsequently executed, and no wasteful image reading operation is performed. Therefore, economical and time efficiencies can be improved. In particular, there can be provided a film image reading apparatus suitable when film images stocked in advance in a slide tray of, e.g., a slide projector are automatically read.

The preferred embodiment of the present invention has been described. However, the present invention is not limited to this, and various changes and modifications may be made within the scope of the appended claims.

What is claimed is:

1. A film image reading apparatus, comprising:
    a plurality of set portions for mounting film mounts in which a frame of a film is mounted;
    conveying means for sequentially conveying the film mount from a respective set portion to a reading portion and for returning the film mount from the reading position to the respective set portion;
    reading means for reading one by one an image of the film mounted on the film mount conveyed one by one by said conveying means to the reading position;
    detecting means for detecting a presence or absence of the film mount in each of said plurality of set portions;
    recording means for recording an image on a recording medium on a basis of an image signal representing the image of the film from said reading means; and
    controlling means for controlling a recording operation of said recording means in accordance with the presence or absence of the film detected by said detecting means.

2. An apparatus according to claim 1, wherein said controlling means controls operations of said conveying means and said reading means on a basis of an output of said detecting means.

3. An apparatus according to claim 2, wherein said detecting means detects the presence of the film mount, said controlling means drives said reading means.

4. An apparatus according to claim 2, wherein when said detecting means detects an absence of the film mount, said controlling means drives said conveying means.

5. An apparatus according to claim 1, wherein said detecting means includes a light emission element and a light receiving element, and detects the presence or absence of the film mount.

6. A film image reading apparatus, comprising:
    setting means for setting a film mount in a reading position, the film mount having a rectangular aperture in which a frame of a film is mounted;
    reading means for reading an image of the film mounted in the film mount set in the reading position;
    detecting means for detecting a direction of the rectangular aperture of the film mount set in a reading position;
    recording means for recording an image on a recording medium on a basis of an image signal representing the image of the film from said reading means; and
    controlling means for controlling the recording operation of said recording means in accordance with the direction of the rectangular aperture detected by said detecting means.

7. An apparatus according to claim 6, wherein said controlling means further comprises means for designating a direction of a recording medium in said recording means in accordance with the direction of the rectangular aperture.

8. An apparatus according to claim 6, wherein said controlling means further comprises means for setting an effective area of an image signal to be output to said recording means in accordance with the direction of the rectangular aperture.

9. An apparatus according to claim 6, wherein said setting means includes conveying means for conveying the film mount to the reading position.

10. An apparatus according to claim 6, wherein said detecting means includes a light emission element and a light receiving element, and detects the direction of the rectangular aperture based on an output of said light receiving element.

11. An apparatus according to claim 6, wherein said setting means sets one by one a plurality of film mounts to the reading position.

12. A film image reading apparatus, comprising:
    a plurality of set portions for setting film mounts in which a frame of a film is mounted;
    conveying means for sequentially conveying a film mount from a respective set portion to a reading position and for returning the film mount from the reading position to the respective set portion;
    reading means for reading one by one an image of the film mounted on the film mount conveyed one by one by said conveying means to the reading position;
    detecting means for sequentially detecting a direction of the film mounted on the film mount conveyed one by one by said conveying means to the reading position;
    recording means for recording an image on a recording medium on a basis of an image signal representing the image of the film from said reading means; and
    controlling means for controlling a recording operation of said recording means in accordance with the direction of the film detected by said detecting means.

13. An apparatus according to claim 12, wherein said controlling means controls operation of said reading means on a basis of an output of said detecting means.

14. An apparatus according to claim 13, wherein said controlling means sets an effective area of an image signal to be output from said reading means.

15. An apparatus according to claim 12, wherein said film mount is provided with a rectangular aperture on which a frame of a film is mounted, and said detecting means detects a direction of the rectangular aperture of the film mount.

16. An apparatus according to claim 15, wherein said detecting means is provided with a light emission element and a light receiving element, an detects the direction of the rectangular aperture based on an output of said light receiving element.

* * * * *

UNITED STATES PATENT AND TRADEMARK OFFICE
CERTIFICATE OF CORRECTION

PATENT NO. : 5,072,311  Page 1 of 2
DATED : December 10, 1991
INVENTOR(S) : Akira Hiramatsu, et al.

It is certified that error appears in the above-identified patent and that said Letters Patent is hereby corrected as shown below:

On the title page, Item [56] References Cited:

UNITED STATES PATENT DOCUMENTS, "4,829,371  5/2989  Hiramatsu et al." should read --4,829,371  5/1989  Hiramatsu et al.

COLUMN 1:

Line 65, "can an" should read --can efficiently read an--.

Line 68, "vide reading" should read --vide a film image reading--.

COLUMN 2:

Line 19, "character" should read --characteristics--.

COLUMN 4:

Line 28, "members 719, 720, 725, and 729" should read --members 719, 720, 725, 728 and 729--.

Line 48, "drum 715" should read --drum 715 and the transfer drum 716, a peeling pawl 750 for--.

COLUMN 7:

Line 30, "201" should read --202--.

UNITED STATES PATENT AND TRADEMARK OFFICE
CERTIFICATE OF CORRECTION

PATENT NO. : 5,072,311
DATED : December 10, 1991
INVENTOR(S) : Akira Hiramatsu, et al.

It is certified that error appears in the above-identified patent and that said Letters Patent is hereby corrected as shown below:

COLUMN 8:

Lines 60-66, Lines 60-66 should be deleted.

COLUMN 9:

Line 44, "wherein said" should read --wherein when said--.

Signed and Sealed this

First Day of June, 1993

MICHAEL K. KIRK

Attesting Officer

Acting Commissioner of Patents and Trademarks